United States Patent
Haas et al.

(10) Patent No.: US 7,170,279 B2
(45) Date of Patent: Jan. 30, 2007

(54) DEVICE AND METHOD FOR MEASURING ANGLES

(75) Inventors: Gunther Haas, St. Grégoire (FR); Henrik Siegle, Leonberg (DE); Ralf Moenikes, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 10/362,316

(22) PCT Filed: Aug. 21, 2001

(86) PCT No.: PCT/DE01/03193

§ 371 (c)(1), (2), (4) Date: May 14, 2003

(87) PCT Pub. No.: WO02/16864

PCT Pub. Date: Feb. 28, 2002

(65) Prior Publication Data

US 2004/0004471 A1 Jan. 8, 2004

(30) Foreign Application Priority Data

Aug. 22, 2000 (DE) ................................ 100 41 089

(51) Int. Cl.
*G01B 7/30* (2006.01)
(52) U.S. Cl. ................. 324/207.25; 324/207.2
(58) Field of Classification Search ............. 324/207.2, 324/207.25, 173, 174
See application file for complete search history.

(56) References Cited

U.S. PATENT DOCUMENTS

| | | | | | |
|---|---|---|---|---|---|
| 4,533,902 A | * | 8/1985 | Baker et al. | .................... | 341/9 |
| 4,862,099 A | * | 8/1989 | Nakai et al. | ................. | 329/318 |
| 4,874,053 A | * | 10/1989 | Kimura et al. | .............. | 180/443 |
| 4,952,940 A | * | 8/1990 | Kuepfer | ....................... | 342/174 |
| 5,680,042 A | * | 10/1997 | Griffen et al. | ......... | 324/207.21 |
| 6,154,025 A | * | 11/2000 | Schelter et al. | ........ | 324/207.21 |
| 6,304,079 B1 | * | 10/2001 | Kenjo et al. | ........... | 324/207.21 |
| 6,433,535 B1 | * | 8/2002 | Marx et al. | ........... | 324/207.21 |
| 6,445,178 B1 | * | 9/2002 | Hoekstra | ................ | 324/207.12 |
| 6,479,987 B1 | * | 11/2002 | Marx et al. | .............. | 324/207.2 |
| 6,788,221 B1 | * | 9/2004 | Ely et al. | ....................... | 341/20 |

FOREIGN PATENT DOCUMENTS

| | | |
|---|---|---|
| DE | 195 34 995 A | 3/1997 |
| DE | 198 17 356 A | 10/1999 |
| EP | 0 596 535 A | 5/1994 |

\* cited by examiner

*Primary Examiner*—Edward Lefkowitz
*Assistant Examiner*—David M. Schindler
(74) *Attorney, Agent, or Firm*—Michael J. Striker

(57) ABSTRACT

A device for angle measurement, having at least one transducer wheel and at least one sensor, including at least one sensor element and cooperating with the transducer wheel, in which by means of the cooperation of the transducer wheel and the sensor, a pair, which can be associated with an angle to be measured, comprising one sine-wave signal and one cosine-wave signal can be obtained, in which at least two sensors are provided, whose sine-wave signals and cosine-wave signals, for obtaining an averaged sine-wave signal and averaged cosine-wave signal, and/or after the formation of an arc tangent signal from the respective averaged or unaveraged sine-wave signals or cosine-wave signals, can be put computationally into relation with one another by means of an evaluation device in order to obtain an averaged arc tangent signal.

10 Claims, 5 Drawing Sheets

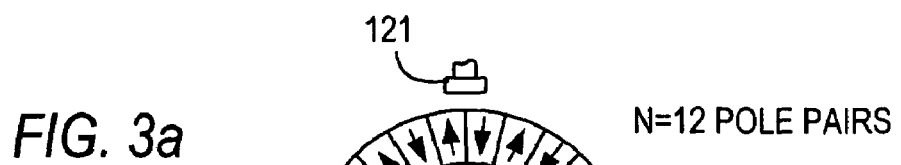
FIG. 3a
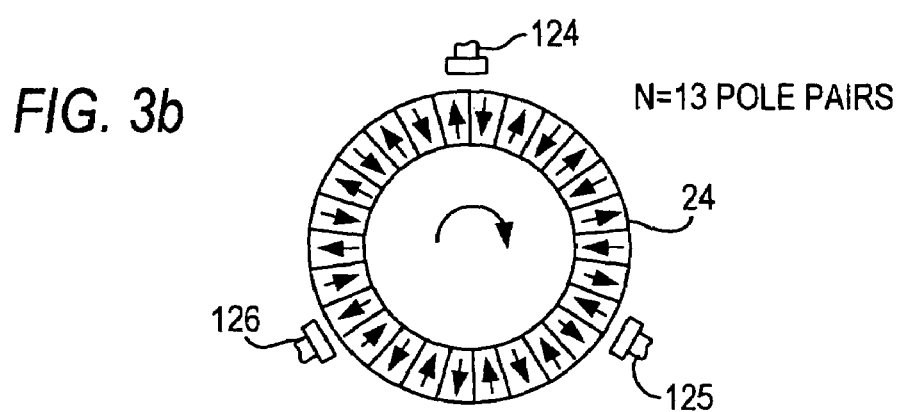
FIG. 3b
FIG. 4
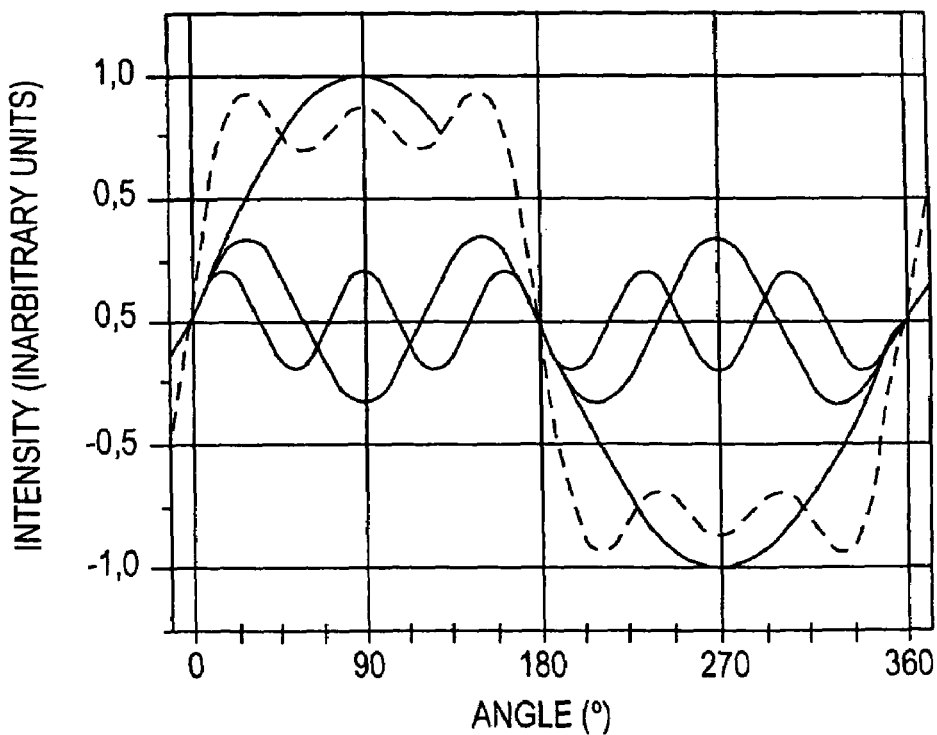

DEVICE AND METHOD FOR MEASURING ANGLES

BACKGROUND OF THE INVENTION

The present invention relates to a device for angle measurement and to a corresponding method.

The demand for high-precision yet also robust angle measuring systems in the automobile industry is constantly rising. At present, the areas in which angle measuring systems are used include an electronic stability program (ESP) and electrically assisted steering systems. Over the long term, the transition to steer-by-wire will increase the demand for angle measuring systems still further, and this development involves a simultaneous increase in the accuracy demanded.

Magnetic sensors are predestined for use in the automobile, because of their contactless, robust measurement principle. If an angle measuring system realized with magnetic sensors is based on scanning a transducer wheel that is either itself magnetized or comprising ferromagnetic material and on moving past the scanning sensor distorts the field of a transducer magnet, production tolerances limit the accuracy of the system. Aspects that are especially problematic are eccentricities, polarization or tooth pitch errors, and nonhomogeneities in the field amplitudes. Moreover, the scanning sensors cannot be positioned arbitrarily accurately, so that additional positioning tolerances are also involved.

Conventional methods for angle measurement are known for instance from German Patent Disclosure DE-P 195 34 995. German Patent Disclosure DE-P 199 58 598.9, which had not yet been published by the filing date of the present application, for instance describes a Nonius method, in which magnetic multipole wheels, each with a different number of pole pairs, are used, and the sensor signals obtained from suitably disposed sensors are evaluated. Once again, however, angle errors are caused by the aforementioned tolerances.

SUMMARY OF THE INVENTION

It is therefore the object of the invention to disclose a device and a method for angle measurement in which angle errors caused by tolerances are reduced.

By the provision according to the invention of a number of sensors, and the averaging of the signals obtained, based on the individual sensor signals, the effects of the aforementioned tolerances on the measurement accuracy can be reduced in a highly effective way.

In a preferred embodiment of the device of the invention, three sensors are provided, which are distributed about the at least one transducer wheel. Sensors arranged at 120° angles from one another form an ideal compromise between the lowest possible number of sensors and the functional capability of the device. Moreover, there are advantages from symmetry in terms of production tolerances. However, it should be emphasized that the method of the invention also functions satisfactorily when only two sensors are used. To further increase the accuracy, however, more than two sensors can also be used.

Expediently, two transducer wheels that are rotatable about a common pivot axis and are disposed in a manner fixed against relative rotation with respect to one another are provided, and the transducer wheels have a different number of transducer segments. According to the invention, arbitrary transducer wheels that utilize magnetic or nonmagnetic measurement principles can be used. For instance, in the case of magnetic multipole wheels, the transducer segments are embodied as pole pairs, while in the case of ferromagnetic gear wheels, they are embodied as teeth.

In this respect it is advantageous that the first transducer wheel has n segments, and the second transducer wheel has n+1 segments. For instance, n can equal 24, but other values can also be selected, depending on the accuracy to be required. Such an embodiment with two different transducer wheels makes it possible to use so-called Nonius methods, with which especially reliable evaluation of the sensor signals obtained is possible.

Expediently, the sensors are embodied as Hall sensors. Such Hall sensors can be obtained economically and prove to be robust and reliable in practice.

In a further preferred feature of the device of the invention, the at least one transducer wheel is embodied as a magnetic multipole wheel.

In an especially preferred feature of the method of the invention, a harmonic correction is performed before and/or after the averaging of the sine-wave signals or cosine-wave signals or arc tangent signals obtained. This kind of harmonic correction can for instance be performed on the basis of a series development, such as Fourier series development of the sine-wave signals or cosine-wave signals obtained.

It is also preferred that the arc tangent averaging includes an offset correction and/or a modulo division for adapting the phase and values range of the various arc tangent signals to be averaged and/or the formation of the arithmetic mean from the thus-modified arc tangent signals.

Expediently, the formation of the arithmetic mean is effected by computationally taking into account the discontinuities of the arc tangent signals to be averaged.

BRIEF DESCRIPTION OF THE DRAWINGS

The invention will now be described in further detail in conjunction with the accompanying drawing. Shown in it are FIG. 1, a graph explaining an angle measurement that can be done with the device;

FIGS. 3a and 3b schematic plan views of a first preferred embodiment of the device of the invention;

FIG. 4, a graph showing a Fourier synthesis of a square wave function;

DESCRIPTION OF THE PREFERRED EMBODIMENTS

Figure 1:
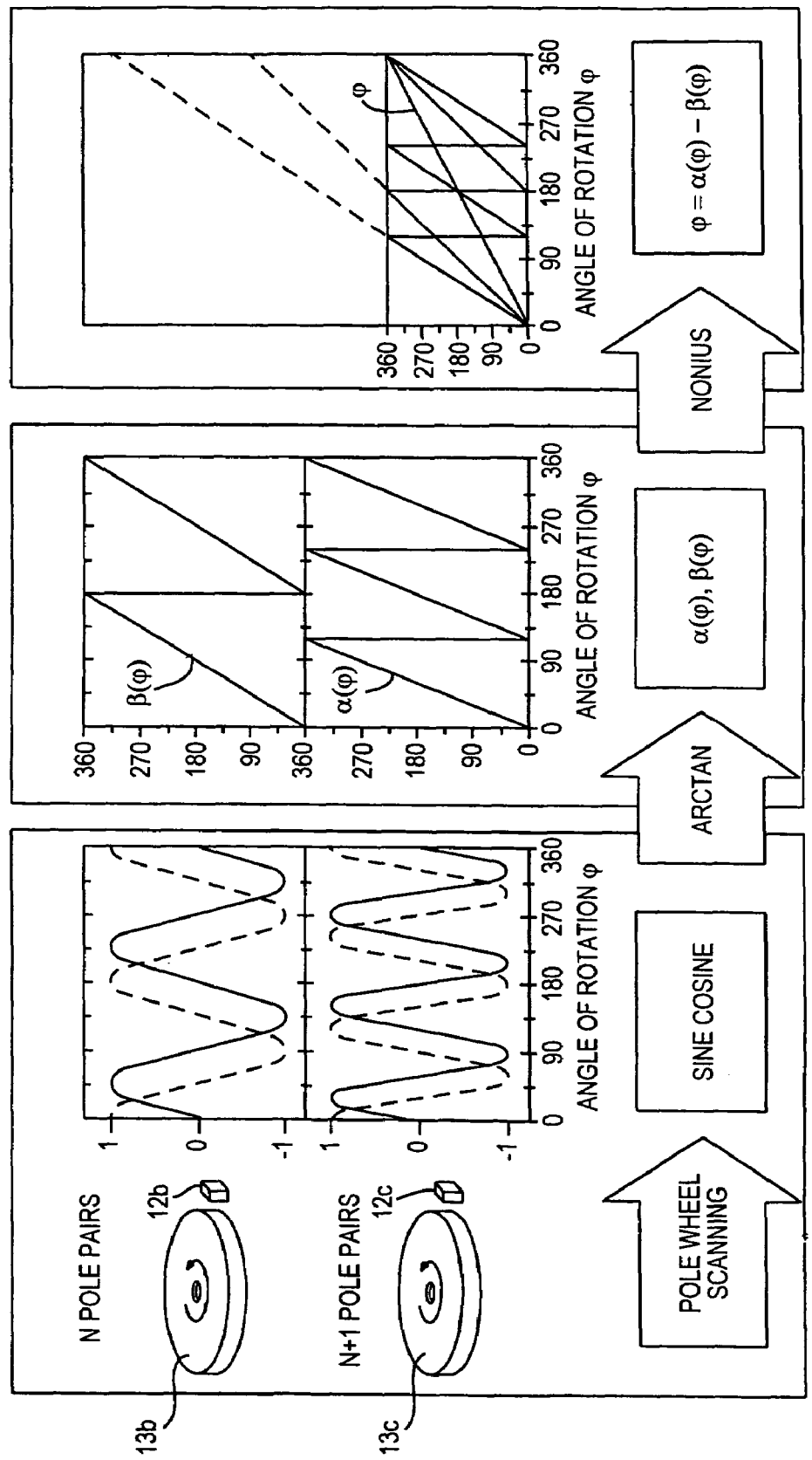

The drawing description below pertains to the special embodiment of scanning of a magnetic multipole wheel. However, the method can also be attained advantageously with other transducer wheels involving nonmagnetic or magnetic measuring principles. The measured values and measurement errors indicated below refer by way of example to pole wheels with n=12 and n=13 pole pairs, and with an outer diameter of 30.8 mm.

The measurement principle on which the invention is based will first be explained in conjunction with FIG. 1.

A steering column is embodied with a torsion bar. Concentrically to the torsion bar, three magnetic multipole wheels are provided. Upon a rotation of the upper part of the steering column relative to the lower part about its longitudinal axis, an angular displacement of the magnetic multipole wheel 13a occurs relative to the remaining magnetic multipole wheels. Disposed next to the multipole wheels is a sensor 12, which has three sensor elements 12a, 12b, 12c that are associated with the multipole wheels 13a, 13b and 13c, respectively. Because of the interaction between the individual multi pole wheels and the sensor elements associated with them, trigonometric signals are generated, from which the angular position of the torsion bar can be derived. Here, a measured angular position relative to the magnetic multipole wheel 13a serves as a reference for the angular position that is ascertained by means of the other magnetic multipole wheels 13b and 13c, as will now be explained in conjunction with FIG. 21. In FIG. 21, the signals produced upon a rotation of the multipole wheels 13b, 13c past the respective sensor elements 12b and 12c are shown.

The sensor elements 12b, 12c each detect one sine-wave signal (solid lines) and one cosine-wave signal (dashed lines). By finding the arc tangent of the respective pairs of signals, two arc tangent signals $\alpha(\phi)$, $\beta(\phi)$ are obtained, which in accordance with the different periodicity of the respective sine/cosine signal pairs, because of the different number of pole pairs, also have a different periodicity. By the classical Nonius method, a function $\phi=\alpha(\phi)-\beta(\phi)$ is now generated, which unequivocally describes the rotational angle $\phi$ over the entire angular range of 360°.

The cosine-wave signals and sine-ways signals of sensor elements disposed in this way are, however, dependent on positioning and production tolerances. This will first be illustrated in conjunction with FIG 2. FIG. 2a, top, shows the magnetic field, measured with a Hall sensor (such as sensor element 12bor 12c), of a typical multipole wheel as a function of the angle; this multipole wheel has already been optimized for pitch and amplitude errors. Together with a signal phase offset from it, which is furnished either by the same or by an additional sensor element, a rotational angle and a position above a pole pair can be determined, as already described in conjunction with FIG. 1. However, an error in the position determination is transferred to the rotational angle of the pole wheel and thus to the entire sensor system.

Although the sine-wave sensor signal shown at the top of FIG. 2a already originates in a transducer wheel that has been optimized for pitch and amplitude errors, an eccentricity in the form of an envelope can nevertheless be seen. This eccentricity is expressed as an angle error, which in the worst case (at angles of approximately 100°), is ±0.4°. The second major error source can also already be seen in the form of higher-frequency modulation. The transducer field of magnetic multipole wheels in fact has a square-wave portion that increases as the spacing between the sensor and the pole wheel decreases and that is expressed in the periodic deviation from the ideal sine-wave transducer field (in this respect also see FIG. 4).

To eliminate the effects of an eccentricity of the transducer wheel relative to its pivot axis, it is now proposed according to the invention that a plurality of sensors or sensor elements be disposed around the transducer wheel, and that the arithmetic mean of the individual sensor signals be formed. In FIG. 3a three sensors 121, 122, 123 are seen, which are disposed concentrically about a multipole wheel 23 at 12O° angles from one another. A further multipole wheel 24 is also shown in FIG. 3b, with which the sensors 124, 125, 126 am associated. The multipole wheel 24 differs from the multipole wheel 23 in having a different number of multipoles. The multipole wheels 23, 24 are shown next to each other solely to make the different numbers of multipoles more readily apparent. It is assumed that they are disposed coaxially one above the other. It will be noted that each sensor 121, 122, 123, 124, 125,126 here can have a plurality of sensor elements, which generate sine-wave signals and cosine-wave signals that are in a fixed phase relationship to one another. The signals obtained from the various sensors can be delivered to an evaluation device 20.

Expediently, In a first preferred embodiment of the method of the invention, the three sine-wave signals obtained for each transducer wheel and the three cosine-wave signals are now averaged arithmetically; on the basis of these averaged sine-wave signals and cosine-wave signals, a corresponding arc tangent signal is generated. The description that follows relates to the signals that can be obtained with a single transducer wheel. Combining the signals of two or more transducer wheels, as has been described above with reference to FIG. 1, is understood to be possible as an additional provision. In the event that for one transducer wheel three arc tangent signals ascertained in this way are averaged, the error shown in FIG. 2b, middle, of ±0.4° is reduced to ±0.4°, as shown in FIG. 2c bottom, curve A. The original angle error resulting from the raw data with the arc tangent method can thus be reduced by a factor of 10.

It should also be noted that the shorter the distance between a sensor and the multipole wheel, the greater the deviation of a generated sensor signal is from the sine-wave to a square-wave function. This square-wave function can be represented, as shown in FIG. 4, in the form of a Fourier series: $a_1 \sin(cx)+a_3 \sin(3cx)+a_5 \sin(5cx)+ \ldots$ The parameter c is fixedly predetermined by the number of poles. The Fourier coefficients a that is, the harmonics, can easily be determined by adaptation of the measurement signal. Even only one to two harmonics are sufficient to reduce the error to ±0.2° as shown in FIG. 2c, bottom, curve B. Moreover, with this method, if magnetoresistive sensors are used, problematic anisotropic effects can be compensated for.

Figure 5:
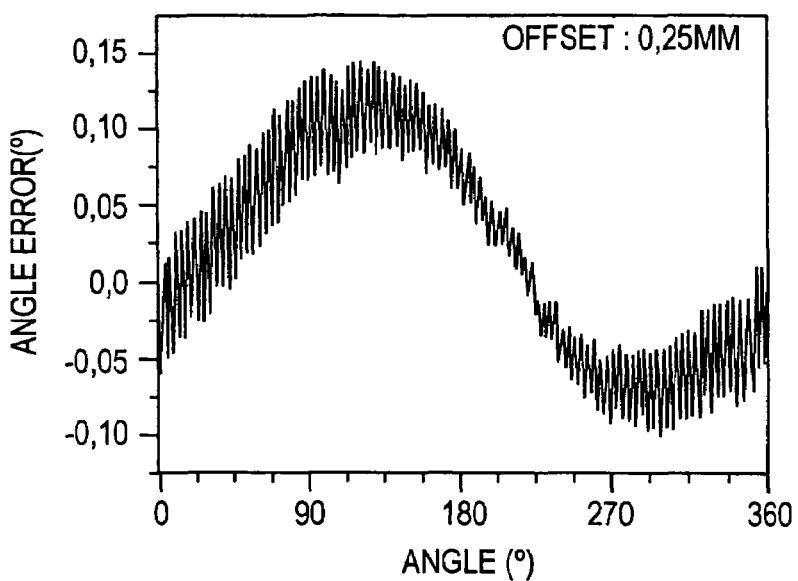
FIG. 5, a graph showing angle errors in sine and cosine averaging and with an offset of 0.25 mm between two sensors or sensor elements.
Figure 6A:
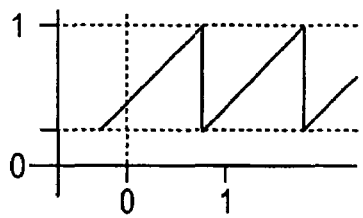
FIGS. 6a–6d, graphs showing the computational processing of a sensor offset by phase adaptation and ensuing arc tangent averaging.
Figure 6B:
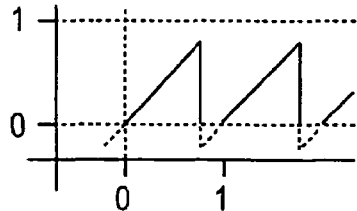
Figure 6C:
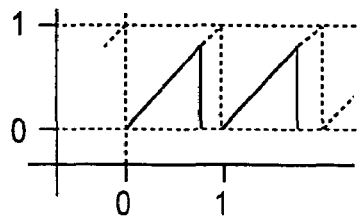
Figure 6D:
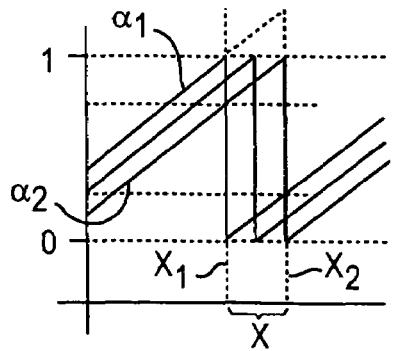

In the description above, it has been assumed that the sensors can be disposed quite precisely and in a well controlled way around the respective transducer wheels. Under real conditions, however, production tolerances have to be considered. Such production tolerances can for instance be due to the fact that a sensor element may not be centrally placed in its housing. Although in such a case the harmonic reduction described still functions, nevertheless the averaging function is drastically worse, as shown in FIG. 5. It is shown here that for an offset of the sensors by 0.25 mm, an angle error of ±0.15° already results. The main reason for this effect is that the various sensors, such as the sensors 121, 122, 123 shown in FIG. 3 no longer measure the same phase of the transducer field. To compensate for such effects, a further preferred embodiment of the method of the invention will now be described, in conjunction with FIGS. 6a–6d, which can be used alternatively or in addition to the procedures already described. Here, it is assumed that first for each individual sensor, such as the sensors 121, 122, 123 of FIG. 2a one arc tangent signal is generated from the various sine-wave signals and cosine-wave signals obtained. However, because of the offset of the sensors, they have an arbitrary phase, as shown in FIG. 6a. To adapt the phase for later averaging, first the offset of the arc tangent is subtracted, as shown in FIG. 6b. Next, a modulo division is performed; that is, the function regions that are negative because of the subtraction of the offset are appended, as shown in FIG. 6c, to the respective peaks of the arc tangent function (that is, the value of 1 is added to the negative function values). The resultant signal, which is shown in part as a dotted line and in part as a solid line in FIG. 6c, has a phase and a values range that match one other. With the modified am tangent signal obtained for each of the three sensors 121, 122, 123 an averaging is now performed.

In this averaging, which is shown schematically for two arc tangent signals in 6d the arithmetic mean of the modified arc tangent signals is formed. It is assumed here that the arc tangent functions $\alpha_1$ and $\alpha_2$ are to be averaged. In particular, the discontinuities should be taken into account, which occur at the beginning (function $\alpha_1$) and at the end (function $\alpha_2$) of the Interval X. Simple addition of the function values in this interval would produce unsatisfactory results, since adding the function values at point $X_1$, for instance, would lead to an averaged function value that is below the function value of $\alpha_2$. One possible way of avoiding this difficulty is to add 1 to the lower measurement values, in the regions where measurement values are in the upper and lower quarter of the values range, that is, in the interval X, and only after that to form the arithmetic mean. Expediently, a modulo division is then again performed, so that the measured values are again at the correct interval [0;1]. Alternatively, the standard deviation could be looked at in order to detect a discontinuity.

Figure 7:
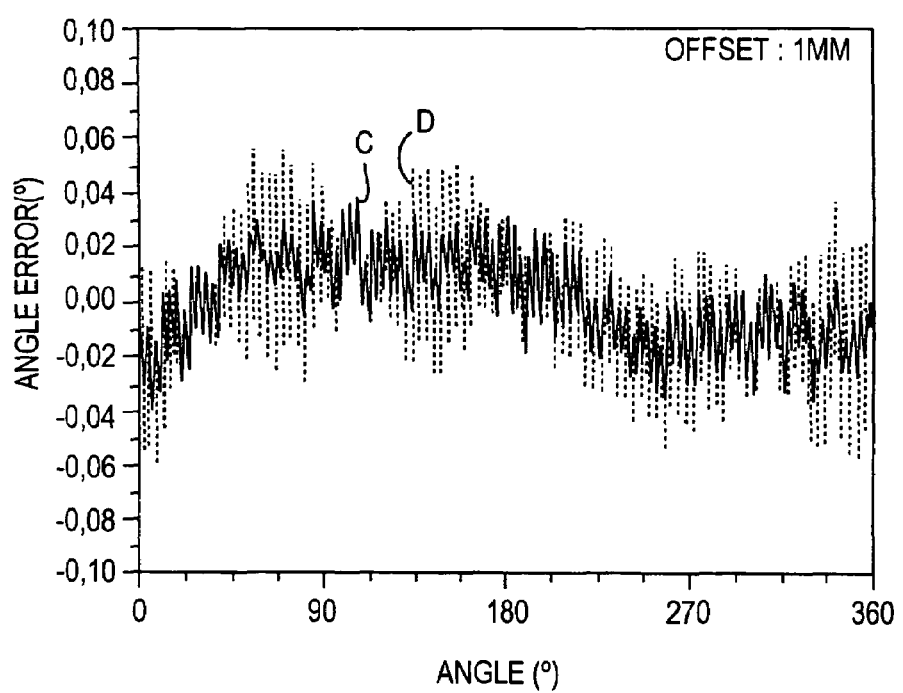
FIG. 7, a graph showing the angle error for the case of an extreme offset between two sensors or sensor elements of 1 mm each after an arc tangent averaging and additionally with a prior harmonic correction.

Analogously to the averaging described above for eliminating the eccentricity, it is also possible in each of the arc tangent averaging methods described to perform the harmonic correction, also already described —as a first step, separately for each sensor element. If an extreme offset of 1 mm for each of the sensor elements is assumed, then with this method an accuracy of 0.04° is still obtained, as shown in FIG. 7, curve C. Without a harmonic correction, an angle error curve with an error of 0.06° is obtained, as shown in FIG. 7 by curve D.

Figure 2A:
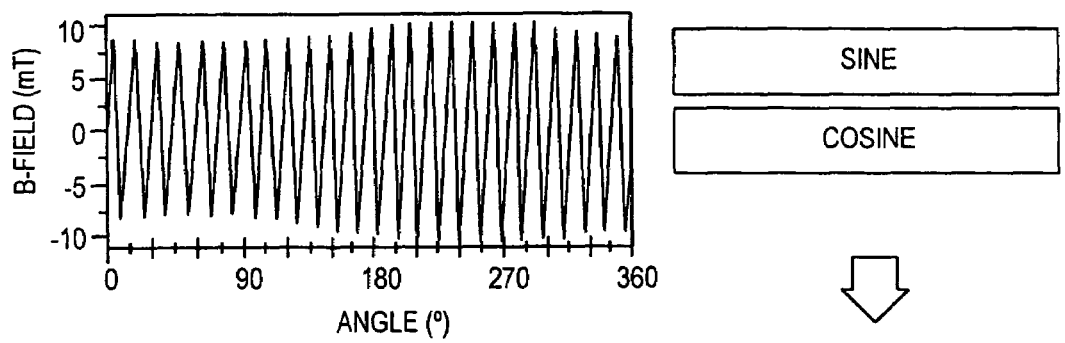
FIGS. 2a–2c, graphs for explaining an error reduction, which can be achieved with the method of the invention, in the angle measurement.
Figure 2B:
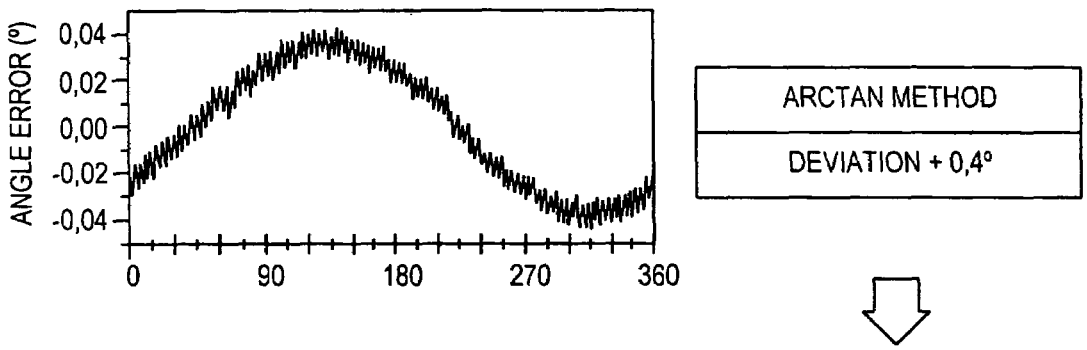
Figure 2C:
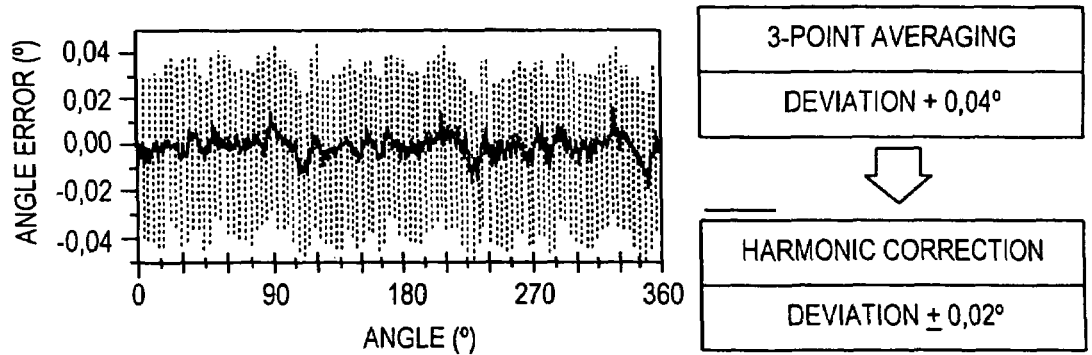

Overall, an arc tangent signal is obtained that corresponds for instance to the signal $\alpha(\phi)$ of FIG. 1 which however compared to that signal is substantially less vulnerable to error or has substantially less error. After a second arc tangent signal corresponding to the signal $\beta(\phi)$ is analogously obtained, the described Nonius method can for instance be employed.

The invention claimed is:

1. A method for angle measurement on the basis of at least one pair of signals, to be associated with an angle to be measured, comprising one sine-wave signal and one cosine-wave signal, which are generated by interaction of transducer wheel means with sensor means: wherein the transducer wheel means comprises two transducer wheels that are rotatable about a common pivot axis and are disposed in a manner fixed against relative rotation with respect to one another with the transducer wheels having a different number of transducer poles, wherein the sensor means comprises three sensors distributed around each transducer wheel which provide at least two pairs of signals each comprising one sine-wave signal and one cosine-wave signal, and the sine-wave signals and cosine-wave signals of the at least two pairs of signals for obtaining an averaged sine-wave signal and an averaged cosine-wave signal, and after the formation of an arc tangent signal from the averaged or unaveraged sine-wave signals and cosine-wave signals, are put computationally into relation with one another for obtaining an averaged arc tangent signal, wherein a harmonic correction of signals obtained is performed before and/or after averaging of these signals, wherein two output signals of the sensors are developed in Fourier series and Fourier coefficients which correspond to harmonics are determined and taken into consideration during a signal processing.

2. A method for angle measurement on the basis of at least one pair of signals, to be associated with an angle to be measured, comprising one sine-wave signal and one cosine-wave signal, which are generated by interaction of transducer wheel means with sensor means; wherein the transducer wheel means comprises two transducer wheels that are rotatable about a common pivot axis and are disposed in a manner fixed against relative rotation with respect to one another with the transducer wheels having a different number of transducer poles, wherein the sensor means comprises three sensors distributed around each transducer wheel which provide at least two pairs of signals each comprising one sine-wave signal and one cosine-wave signal, and the sine-wave signals and cosine-wave signals of the at least two pairs of signals for obtaining an averaged sine-wave signal and an average cosine-wave signal, and after the formation of an arc tangent signal from the averaged or unaveraged sine-wave signals and cosine-wave signals, are put computationally into relation with one another for obtaining an averaged arc tangent signal, wherein arc tangent averaging includes an offset correction and a module division for adapting phase and values range of various arc tangent signals to be averaged and a formation of an arithmetic mean from averaged arc tangent signals.

3. The method of claim 2, wherein the formation of the arithmetic mean is effected by computationally taking into account discontinuities of the arc tangent signals to be averaged.

4. The method of claim 2, wherein a harmonic correction of signals obtained is performed before and/or after the averaging of these signals, wherein two output signals of the sensors are developed in Fourier series and Fourier coefficients which correspond to harmonics are determined and taken into consideration during a signal processing.

5. A device for angle measurement, having transducer wheel means and sensor means cooperating with me transducer wheel means, in which by cooperation of the transducer wheel means and the sensor means, a pair of signals, which can be associated with an angle to be measured, comprising one sine-wave signal and one cosine-wave signal are obtained.

wherein the transducer wheel means include two transducer wheels that are rotatable about a common pivot axis and are disposed in a manner fixed against relative rotation with respect to one another, and the transducer wheels have a different number of transducer poles.

wherein the sensor means include three sensors distributed around each transducer wheel, whose sine-wave signals and cosine-wave signals, for obtaining an averaged sine-wave signal and an averaged cosine-wave signal, and after the formation of an arc tangent signal from the averaged or unaveraged sine-wave signals and cosine-wave signals, are put computationally into relation with one another for obtaining an averaged arc tangent signal, wherein a harmonic correction of signals obtained is performed before and/or after averaging of those signals, wherein two output signals of the sensors are developed in Fourier series and Fourier coefficients which correspond to harmonics are determined and taken into consideration during a signal processing.

6. The device of claim 5, wherein the first transducer wheel has n poles pairs, and the second transducer wheel has n+1 poles pairs.

7. The device of claim 5, wherein the sensors are embodied as Hall sensors.

8. The device of claim 5, wherein the transducer wheels are embodied a magnetic multipole wheels.

9. A device for angle measurement, having transducer wheel means and censor means cooperating with the transducer wheel means, in which by cooperation of the transducer wheel means and the sensor means, a pair of signals, which can be associated with an angle to be measured, comprising one sine-wave signal and one cosine-wave signal are obtained, wherein the transducer wheel means include two transducer wheels that are rotatable about a common pivot axis and are disposed in a manner fixed against relative rotation with respect to one another, and the transducer wheels have a different number of transducer poles, wherein the sensor means include three sensors distributed around each transducer wheel, whose sine-wave signals and cosine-wave signals, for obtaining an averaged sine-wave signal and an averaged cosine-wave signal, and after the formation of an arc tangent signal from the respective averaged or unaveraged sine-wave signals and, cosine-wave signals, are put computationally into relation with one another for obtaining an averaged arc tangent signal, wherein arc tangent averaging includes an offset correction and a modulo division for adapting phase and values range of various arc tangent signals to be averaged and a formation of an arithmetic mean from averaged arc tangent signals.

10. The method of claim 9, wherein a harmonic correction of signals obtained is performed before and/or after averaging of these signals, wherein two output signals of the sensors are developed in Fourier series and Fourier coefficients which correspond to harmonics are determined and taken into consideration during a signal processing.

* * * * *